(12) United States Patent
Reese et al.

(10) Patent No.: US 10,713,037 B2
(45) Date of Patent: Jul. 14, 2020

(54) SYSTEMS AND METHODS FOR CONCURRENTLY HOSTING LEGACY AND NEW SYSTEMS

(71) Applicant: Walmart Apollo, LLC, Bentonville, AR (US)

(72) Inventors: Daniel Laurence Reese, Spanish Fork, UT (US); Alexander Robert Johnson, Portland, OR (US)

(73) Assignee: WALMART APOLLO, LLC, Bentonville, AR (US)

( * ) Notice: Subject to any disclaimer, the term of this patent is extended or adjusted under 35 U.S.C. 154(b) by 53 days.

(21) Appl. No.: 16/051,175

(22) Filed: Jul. 31, 2018

(65) Prior Publication Data
US 2020/0042314 A1     Feb. 6, 2020

(51) Int. Cl.
*G06F 15/16*     (2006.01)
*G06F 8/71*     (2018.01)
*H04L 29/08*     (2006.01)

(52) U.S. Cl.
CPC .............. *G06F 8/71* (2013.01); *H04L 67/327* (2013.01); *H04L 67/34* (2013.01)

(58) Field of Classification Search
CPC .......... H04L 67/327; H04L 67/34; G06F 8/71
See application file for complete search history.

(56) References Cited

U.S. PATENT DOCUMENTS

| | | | |
|---|---|---|---|
| 10,019,255 B1* | 7/2018 | Greenfield | G06F 8/65 |
| 2013/0111458 A1* | 5/2013 | Quin | G06F 8/658 |
| | | | 717/172 |
| 2017/0346682 A1* | 11/2017 | Ni | G06F 8/656 |
| 2018/0260813 A1* | 9/2018 | Pi Farias | G06Q 20/203 |
| 2018/0260814 A1* | 9/2018 | Pi Farias | G06Q 20/203 |

\* cited by examiner

*Primary Examiner* — Moustafa M Meky
(74) *Attorney, Agent, or Firm* — Bryan Cave Leighton Paisner LLP

(57) ABSTRACT

Various embodiments include a system including one or more processing modules and one or more non-transitory storage modules storing computing instructions configured to run on the one or more processing modules and perform acts of: grouping one or more endpoints into endpoint groups such that each endpoint group of the endpoint groups can be processed by both a legacy software and a new software; receiving a request from a user, the request comprising the one or more endpoints; upon receiving the request, automatically and dynamically determining in real-time whether the request is a legacy software request for the legacy software or a new software request for the new software; and automatically either: processing the request using the legacy software when the automatically and dynamically determining in real-time determines that the request is the legacy software request; or processing the request using the new software when the automatically and dynamically determining in real-time determines that the request is the new software request. Other embodiments are disclosed herein.

20 Claims, 7 Drawing Sheets

US 10,713,037 B2

SYSTEMS AND METHODS FOR CONCURRENTLY HOSTING LEGACY AND NEW SYSTEMS

TECHNICAL FIELD

This disclosure relates generally to computer architecture software and information security, and more particularly to interprocess communication and software development.

BACKGROUND

In light of the fast and increasing pace of modern software development, many firms and individuals face issues migrating user accounts and user applications from legacy software to new software systems. This is further compounded by the fact that many computer systems used by users cannot be upgraded from legacy systems due to various hardware and/or software constraints. Thus servers hosting the back end of software applications need to be able to communicate with both legacy and new systems. One solution is to have a separate server for handling legacy software applications, but this can easily become cost prohibitive. Accordingly, there is a need for a system and method to concurrently host both legacy and new systems.

BRIEF DESCRIPTION OF THE DRAWINGS

To facilitate further description of the embodiments, the following drawings are provided in which.

Figure 1:
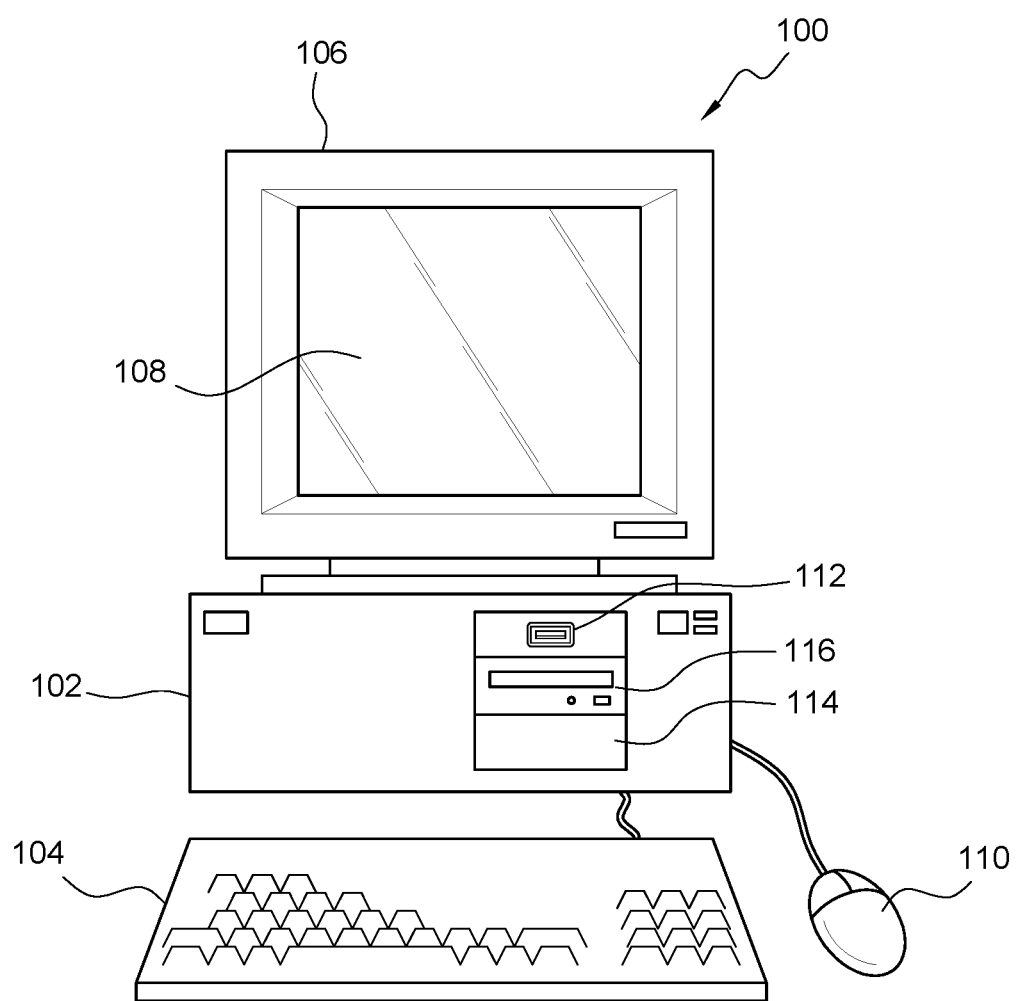
FIG. 1 illustrates a front elevational view of a computer system that is suitable for implementing various embodiments of the systems disclosed in FIGS. 3, 5 and 7.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform acts of: grouping one or more endpoints into endpoint groups such that each endpoint group of the endpoint groups can be processed by both a legacy software and a new software; receiving a request from a user, the request comprising the one or more endpoints; upon receiving the request, automatically and dynamically determining in real-time whether the request is a legacy software request for the legacy software or a new software request for the new software; and automatically either: processing the request using the legacy software when the automatically and dynamically determining in real-time determines that the request is the legacy software request; or processing the request using the new software when the automatically and dynamically determining in real-time determines that the request is the new software request.

Various embodiments include a method. The method can include grouping one or more endpoints into endpoint groups such that each endpoint group of the endpoint groups can be processed by both a legacy software and a new software; receiving a request from a user, the request comprising the one or more endpoints; upon receiving the request, automatically and dynamically determining in real-time whether the request is a legacy software request for the legacy software or a new software request for the new software; and automatically either: processing the request using the legacy software when the automatically and dynamically determining in real-time determines that the request is the legacy software request; or processing the request using the new software when the automatically and dynamically determining in real-time determines that the request is the new software request.

Figure 2:
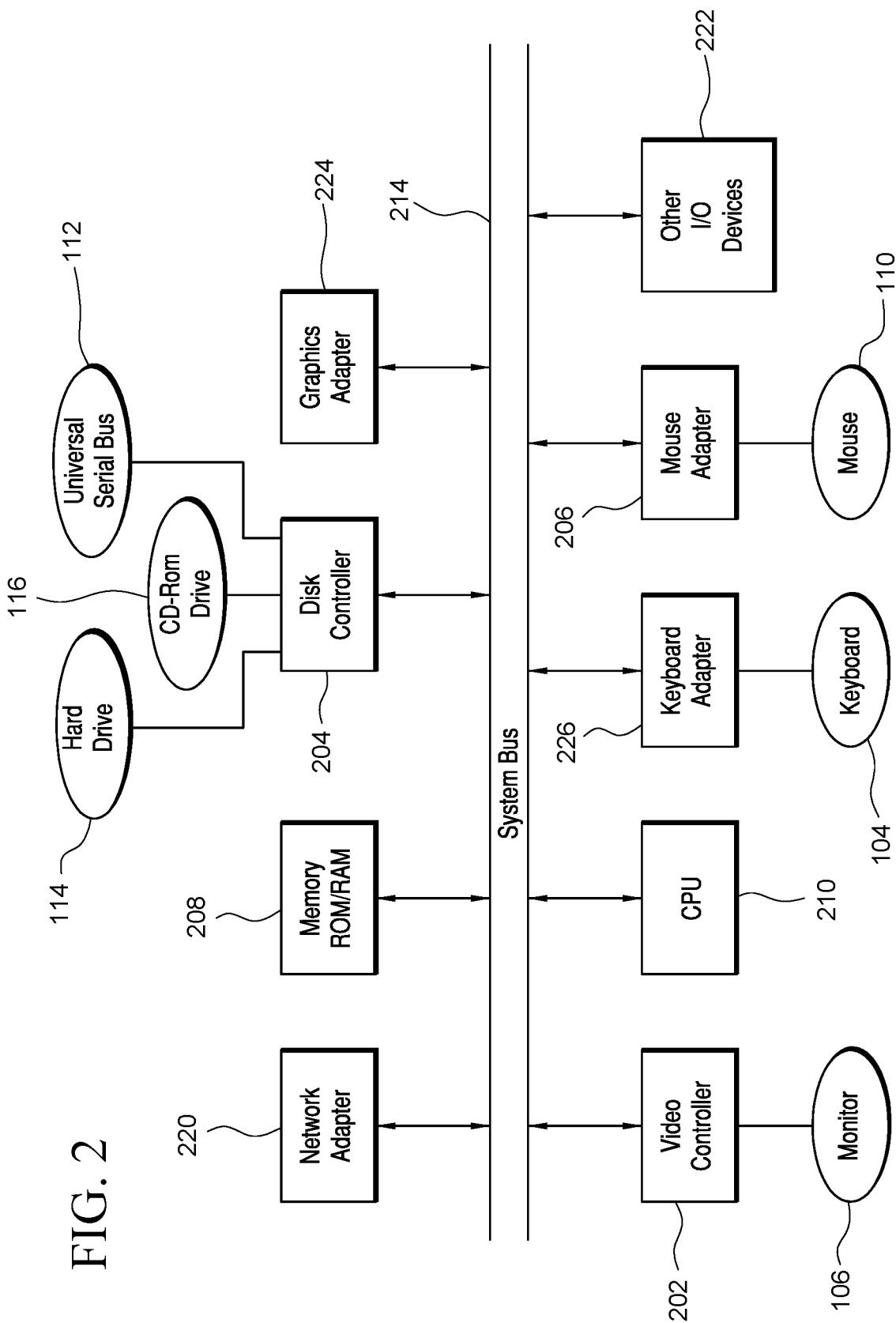
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
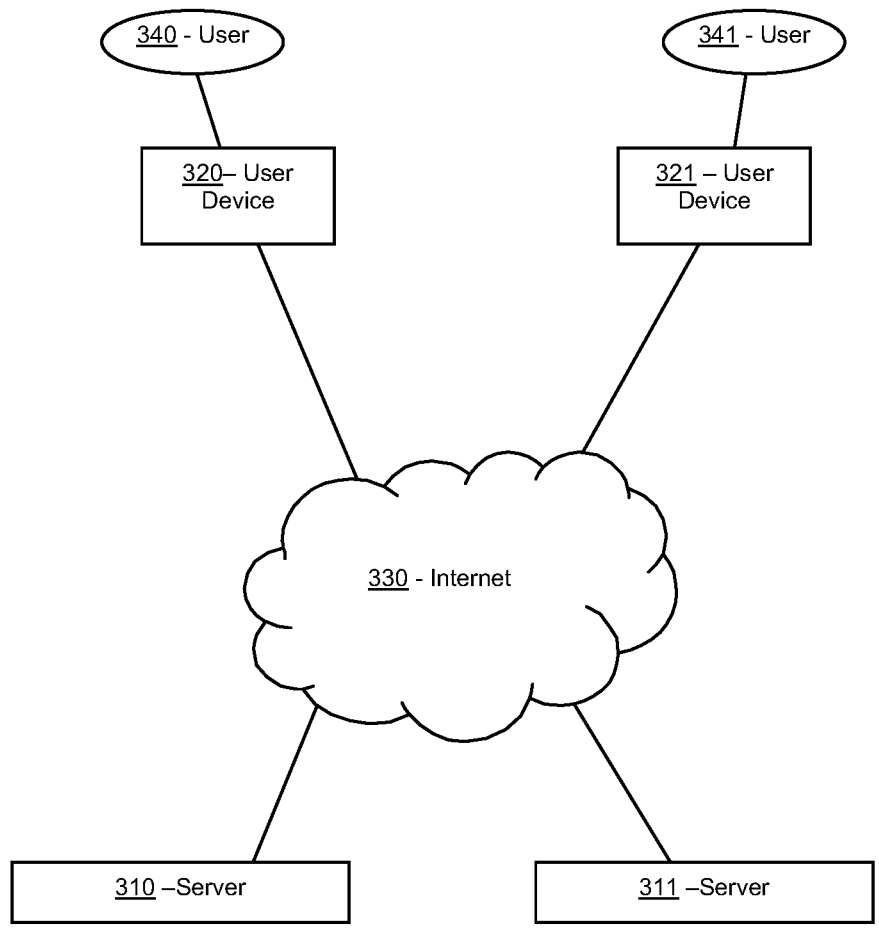
FIG. 3 illustrates a representative block diagram of a system, according to an embodiment.

Turning ahead in the drawings, FIG. 3 illustrates a block diagram of a system 300 that can be employed for concurrently hosting legacy and new systems, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include servers 310, 311, user devices 320, 321 operated by users 340, 341, and an internet 330. Servers 310, 311, user devices 320, 321, and internet 340 can each be a computer system, such as computer system 100 (FIG. 1), as described above, and can each be a single computer, a single server, or a cluster or collection of computers or servers, or a cloud of computers or servers. In another embodiment, a single computer system can host each of and/or two or more of servers 310, 311, user devices 320, 321, and internet 340. Additional details regarding servers 310, 311, user devices 320, 321, and internet 340 are described herein.

User devices 320, 321 can comprise any of the elements described in relation to computer system 100. In some embodiments, user devices 320, 321 can be mobile devices and/or mobile electronic devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on a user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of a user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, servers 310, 311 can be in data communication through Internet 330 with user devices (e.g., 320, 321) and/or each other. In certain embodiments, user devices 320, 321 can be desktop computers, laptop computers, smart phones, tablet devices, and/or other endpoint devices. Servers 310, 311 can host one or more websites. For example, servers 310, 311 can host an eCommerce web site that allows users to browse and/or search for products, to add products to an electronic shopping cart, and/or to purchase products, in addition to other suitable activities.

In many embodiments, servers 310, 311 and user devices 320, 321 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of servers 310, 311 and/or user devices 320, 321 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of servers 310, 311 and/or user devices 320, 321. In a similar manner, the processing module(s) and the memory storage module(s) can be local and/or remote to each other.

In many embodiments, servers 310, 311 can be configured to communicate with one or more user devices 320, 321. In some embodiments, user devices 320, 321 also can be referred to as customer computers. In some embodiments, servers 310, 311 can communicate or interface (e.g., interact) with one or more customer computers (such as user devices 320, 321) through a network or internet 330. Internet 330 can be an intranet that is not open to the public. Accordingly, in many embodiments, servers 310, 311 (and/or the software used by such systems) can refer to a back end of system 300 operated by an operator and/or administrator of system 300, and user devices 320, 321 (and/or the software used by such systems) can refer to a front end of system 300 used by one or more users 350 and 351, respectively. In some embodiments, users 340 and 341 also can be referred to as customers, in which case, user devices 320, 321 can be referred to as customer devices. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, servers 310, 311 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between servers 310, 311 and/or user devices 320, 321, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Interoperability of legacy and new software systems is a problem that has plagued computer systems since their inception. Without interoperability, errors can often occur, data can be corrupted, and overall efficiency of the computer system can be drastically reduced. These problems are further compounded when legacy and new software systems performing the same tasks are in communication with the same servers hosting a back end of the software.

In many embodiments, the techniques described herein can provide several technological improvements. Specifically, the techniques described herein provide for faster and more efficient communication between legacy software, new software, and backend services. This approach is different from previous approaches, which proceed by achieving a mass migration of user devices from legacy to new software systems through software updates. Instead of using these previous approaches, the techniques described herein permit the legacy software systems and new software systems to co-exist with each other and to be used in parallel with each other. Accordingly, the complicated and time consuming practice of updating or migrating legacy software systems to new software systems within a transition time period can be eliminated, and/or the transition time period can be significantly lengthened without adversely impacting the user experience. Further, the application of the techniques disclosed herein address problems that do not exist outside of computer networks, such as the interoperability of two versions of software systems.

Figure 4:
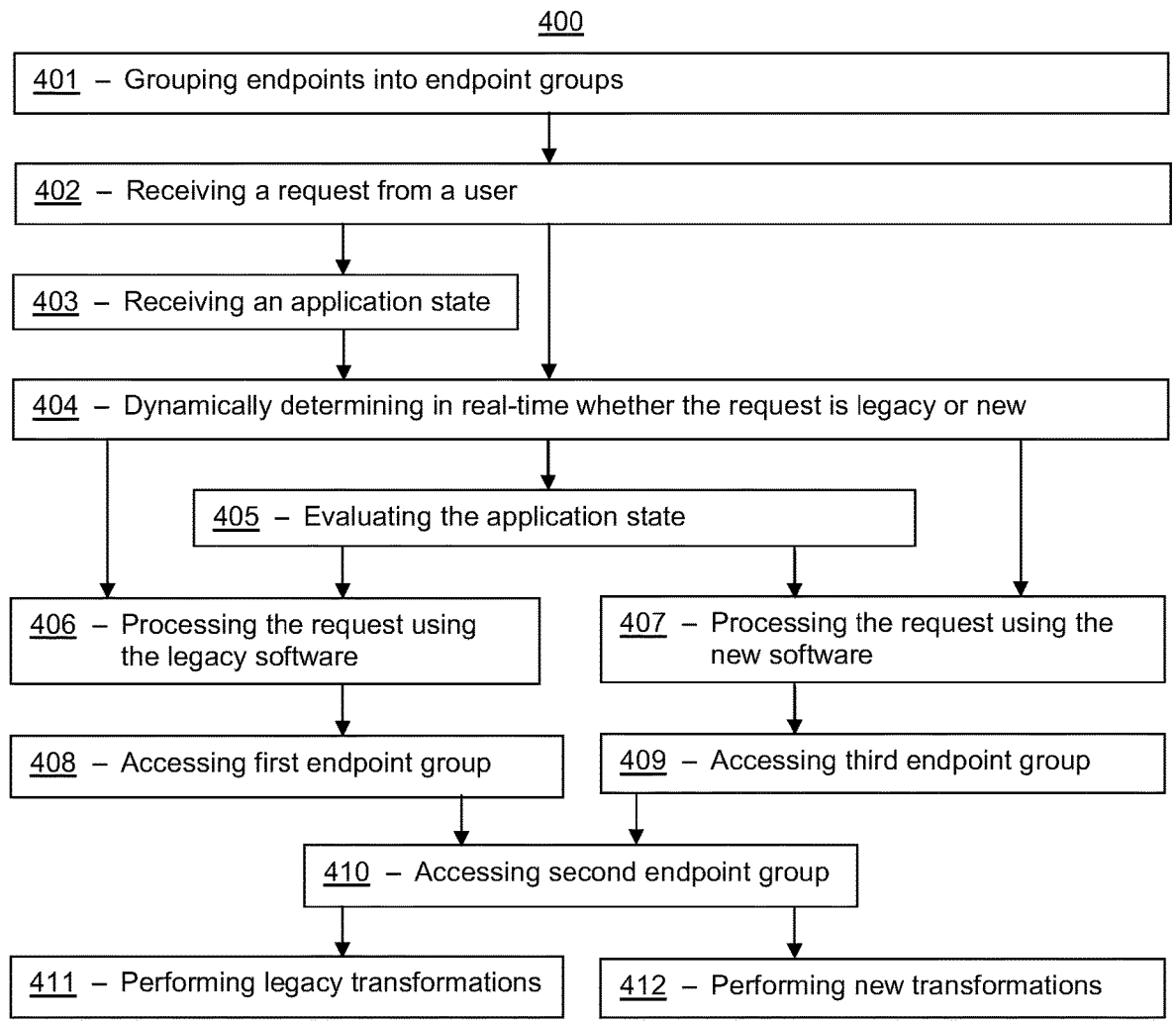
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as servers 310, 311 and/or user devices 320, 321. The processing module(s) can be similar or identical to the processing module(s) described above with respect to computer system 100 (FIG. 1).

In many embodiments, method 400 can comprise an activity 401 of grouping endpoints into endpoint groups. In some embodiments, an endpoint can comprise a URL or website that is accessed or serviced by a piece of software. For example, https://grocery.walmart.com/v3/api/session can be an endpoint. In the same or different embodiments, an endpoint can be accessed by a user 340, 341 on a user device 320, 321 (FIG. 3). In various embodiments, an endpoint can process a user request and forward it to a service. For example, in some embodiments, one endpoint can authenticate a user when he signs into a user account while another endpoint can update an electronic shopping cart of a user when a user adds or removes an item from it. In the same or different embodiments, endpoints can trigger a particular brick and mortar store's inventory information to be displayed in an application, trigger a particular brick and mortar store's pricing information to be displayed in an application, reserve a pick-up time at a particular brick and mortar store, reserve a delivery time at a particular brick and mortar store, reserve a delivery time from a particular brick and mortar store to a location selected by the user, place a new order at a particular brick and mortar store for a previously reserved time, review previously placed orders, create an account of a user, process a payment method of a user, receive and store a delivery address of a user, confirm an order with a user, search a product catalogue, browse a product catalogue, filter a product catalogue, display and track featured products, display and track popular products, display and track recent purchases by a user, save payment methods, save delivery addresses.

In some embodiments, an endpoint group can comprise one endpoint. For example, in various embodiments, an endpoint group can comprise a single endpoint used for registering a user. In different embodiments, an endpoint group can comprise multiple endpoints. For example, in some embodiments, an endpoint group can comprise endpoints that service an entire section of an application, such as online checkout from an ecommerce marketplace. In various embodiments, an endpoint group can be comprised of endpoints logically grouped by services that implement them. In the same or different embodiments, endpoint groups can be comprised of endpoints grouped such that all or a portion of endpoint groups can be serviced by both legacy software services and new software services. In embodiments where endpoint groups can be serviced by both legacy and new software services, endpoint groups can be smaller than endpoint groups in embodiments where they are not able to be serviced by both legacy and new software services. In some embodiments, endpoint groups can comprise user authentication operations, user registration operations, shopping cart operations, checkout operations, product information operations, product recommendation operations, customer information operations, order history operations, and/or favorite products operations.

In various embodiments, an authentication operations endpoint group can comprise endpoints that can sign into an account of a user and/or sign out of an account of a user. In the same or different embodiments, a registration operations endpoint group can comprise endpoints that create a new account. In some embodiments, a shopping cart operations endpoint group can comprise endpoints that add items to an electronic shopping car, remove items from an electronic shopping cart, and/or update quantities in an electronic shopping cart. In many embodiments, a checkout operations endpoint group can comprise endpoints that reserve a pick-up time at a particular brick and mortar store, reserve a delivery time at a particular brick and mortar store, reserve a delivery time from a particular brick and mortar store to a location selected by the user, place a new order at a particular brick and mortar store for a previously reserved time, receive and store a delivery address of a user, and/or confirm the order with the user. In various embodiments, product information operations endpoint group can comprise endpoints that search a product catalogue, filter a product catalogue, and/or browse a product catalogue. In some embodiments, a product recommendations operations endpoint group can comprise endpoints that display and track featured products, display and track popular products, and/or display and track recent purchases by a user. In the same or different embodiments, a customer information operations endpoint group can comprise endpoints that save payment methods of a user and/or save delivery addresses of a user. In some embodiments, an order history operations endpoint group can comprise endpoints that display, track, and/or manage an order history of a user. In many embodiments, a favorite products operations endpoint group can comprise endpoints that display, track, and/or manage favorite products of a user.

In various embodiments, the endpoints and endpoint groups described above can be grouped into other endpoint groups depending on the configurations of the associated legacy software and new software. In some embodiments, a service can comprise software applications running on a server 310, 311 or a user device 320, 321 (FIG. 3) that communicates using various communication protocols described above and/or other communication protocols in use now or developed in the future.

In some embodiments, activity 401 can comprise using a distributed network comprising distributed memory architecture to group endpoints into endpoint groups. This distributed architecture can reduce the impact on the network and system resources to reduce congestion in bottlenecks while still allowing data to be accessible from a central location.

In many embodiments, method 400 can comprise an activity 402 of receiving a request from a user. In some embodiments, a request can come from a user device 320, 321 operated by a user 340, 341 (FIG. 3). In various embodiments, a request from a user can comprise one or more endpoints. In the same or different embodiments, a request can comprise one or more endpoint groups. In some embodiments, activity 402 can comprise using a distributed network comprising distributed memory architecture to receive a request from a user. This distributed architecture can reduce the impact on the network and system resources to reduce congestion in bottlenecks while still allowing data to be accessible from a central location.

In many embodiments, method 400 can comprise an activity 403 of receiving an application state. In some embodiments, activity 403 can be performed in conjunction with, at the same time as, or completely separate from and after activity 402. In various embodiments, the application state can comprise stateful data stored in an application. For example, the application state can comprise data about a name of a user, an email address of a user, items placed in an electronic shopping cart of a user, a preferred brick and mortar store of a user, orders of a user that have been place, but not picked up, and/or order of a user that have been placed, but not delivered. In the same or different embodiments, the application state can comprise a remote software configuration value indicating when legacy software or new software processes request, a remote service configuration value indicating when a specific service of legacy software or a specific service of new software processes request; a store value indicating when a brick and mortar retail store selected by a user requires either legacy software or new software; a sign-in value indicating when a user is signed into an account of a user; and/or an account value indicating when an account of a user requires either legacy software or new software. In some embodiments, the application state can be stored in an application data store. In the same or different embodiments, an application data store can be stored on user devices 320, 321. In many embodiments, an application data store can comprise a relational database or a graph database. In some embodiments, activity 403 can comprise using a distributed network comprising distributed memory architecture to receive a request from a user. This distributed architecture can reduce the impact on the network and system resources to reduce congestion in bottlenecks while still allowing data to be accessible from a central location.

In many embodiments, method 400 can comprise an activity 404 of dynamically determining in real-time whether a request is a legacy software request or a new software request. In many embodiments, activity 404 can occur automatically after activity 402 of receiving the request from the user, and also can occur automatically after activity 403 of receiving the application state. In some embodiments, requests can be evaluated continually as they are received to determine whether a request is a legacy software request or a new software request. In this way, software modules of an application on user devices 320, 321 can be split between legacy software and new software, and an application can easily and seamlessly change between the two software modules and, thus, the legacy software and the new software without causing errors. In some embodiments, activity 404 can comprise using a distributed network comprising distributed memory architecture to dynamically determine in real-time whether a request is a legacy software request or a new software request. This distributed architecture can reduce the impact on the network and system resources to reduce congestion in bottlenecks while still allowing data to be accessible from a central location.

In many embodiments, method 400 can comprise activity 405 of evaluating an application state. In some embodiments, activity 405 is performed as part of activity 404 in order to determine whether a request is a legacy request or a new request. In some embodiments, when an application state comprises a remote software configuration value indicating that a legacy software processes a request, the request is determined to be a legacy request. In the same or different embodiments, when an application state comprises a remote software configuration value indicating that a new software processes a request, the request is determined to be a new request. In various embodiments, when an application state comprises a remote service configuration value indicating when a specific service of a legacy software processes a request, the request is determined to be a legacy request. In the same or different embodiments, when an application state comprises a remote service configuration value indicating when a specific service of a new software processes a request, the request is determined to be a new request. In some embodiments, when an application state comprises a store value indicating when a brick and mortar retail store selected by a user requires legacy software, a request is determined to be a legacy request. In the same or different embodiments, when an application state comprises a store value indicating when a brick and mortar retail store selected by a user requires new software, a request is determined to be a new request. In various embodiments, when an application state comprises a sign-in value indicating that a user is signed into a legacy account of a user, a request is determined to be a legacy request. In some embodiments, when an application state comprises a sign-in value indicating that a user is signed into a new account of a user, a request is determined to be a new request. In the same or different embodiments, when an application state comprises a sign-in value indicating that a user is not signed into an account of a user, a request is determined to be a new request. In some embodiments, when an application state comprises an account value indicating that an account of a user requires legacy software, a request is determined to be a legacy request. In the same or different embodiments, when an application state comprises an account value indicating that an account of a user requires new software, a request is determined to be a new request. In various embodiments, other types of application state described above can be evaluated to determine whether a request is a legacy software request or a new software request. In some embodiments, activity 405 can comprise using a distributed network comprising distributed memory architecture to evaluate an application state. This distributed architecture can reduce the impact on the network and system resources to reduce congestion in bottlenecks while still allowing data to be accessible from a central location.

In many embodiments, method 400 can comprise activity 406 of processing a request using legacy software. Activity 406 can occur automatically without human intervention. For example, in some embodiments, activity 406 can occur automatically after activity 404 dynamically determines in real-time that the request is the legacy software request, and also can occur automatically after activity 405 of evaluating the application state. In various embodiments, activity 406 can occur instead of or concurrently with activity 407 (described below). In some embodiments, processing a request using legacy software can comprise creating a user account, updating account information, authorizing a user account login, updating an electronic shopping cart, completing a transaction on an online marketplace, recommending products, managing customer information, searching a product catalogue, managing an order history of a user, and/or managing favorite products of a user. In various embodiments, processing a request using legacy software can comprise achieving the goal of any of the endpoints or endpoint groups described above. In some embodiments, activity 406 can comprise using a distributed network comprising distributed memory architecture to process a request using legacy software. This distributed architecture can reduce the impact on the network and system resources to reduce congestion in bottlenecks while still allowing data to be accessible from a central location.

In many embodiments, method 400 can comprise activity 407 of processing a request using new software. Activity 407 can occur automatically without human intervention. For example, in some embodiments, activity 407 can occur automatically after activity 404 dynamically determines in real-time that the request is the new software request, and also can occur automatically after activity 405 of evaluating the application state. In various embodiments, activity 407 can occur instead of or concurrently with activity 406 (described above). In some embodiments, processing a request using new software can comprise creating a user account, updating account information, authorizing a user account login, updating an electronic shopping cart, completing a transaction on an online marketplace, recommending products, managing customer information, searching a product catalogue, managing an order history of a user, and/or managing favorite products of a user. In various embodiments, processing a request using new software can comprise achieving the goal of any of the endpoints or endpoint groups described above. In some embodiments, activity 407 can comprise using a distributed network comprising distributed memory architecture to process a request using new software. This distributed architecture can reduce the impact on the network and system resources to reduce congestion in bottlenecks while still allowing data to be accessible from a central location.

In many embodiments, method 400 can comprise activity 408 of accessing a first endpoint group. In various embodiments, activity 408 can be performed as a part of and/or in addition to activity 406. In some embodiments, the first endpoint group can be an endpoint group only accessed by legacy software.

In many embodiments, method 400 can comprise activity 409 of accessing a third endpoint group. In various embodiments, activity 409 can be performed as a part of and/or in addition to activity 407. In some embodiments, the third endpoint group can be an endpoint group only accessed by new software.

In many embodiments, method 400 can comprise activity 410 of accessing a second endpoint group. In various embodiments, activity 410 can be performed as a part of and/or in addition to activities 406, 407. In some embodiments, the second endpoint group can be an endpoint group accessible by both legacy software and new software. In this way, the interoperability of legacy software and new software can be achieved because both can access a second endpoint group, and then use that endpoint group to fulfill a request from a user. In some embodiments, activities 408, 409, 410 can comprise using a distributed network comprising distributed memory architecture to access endpoint groups. This distributed architecture can reduce the impact on the network and system resources to reduce congestion in bottlenecks while still allowing data to be accessible from a central location.

In many embodiments, method 400 can comprise activity 411 of performing legacy transformations. In some embodiments, activity 411 can be performed as a part of or separate from and after activity 406 and/or can be performed after activity 410. In various embodiments, data accessed by legacy software needs to be modified and/or transformed in order to be processed efficiently and correctly. In the same or different embodiments, activity 411 can comprise a series of discrete transformations. In various embodiments, a discrete transformation can comprise at least one of redefining a name of a data field. In the same or different embodiments, a discrete transformation can comprise summing two data fields. In many embodiments, a discrete transformation can comprise searching a data field, and, when that data field is empty, requesting an input from a user. In the same or different embodiments, a discrete transformation can comprise aggregating values from several data fields, and then deriving a single data field value based on the aggregated value. In some embodiments, activity 411 can comprise using a distributed network comprising distributed memory architecture to perform legacy transformations. This distributed architecture can reduce the impact on the network and system resources to reduce congestion in bottlenecks while still allowing data to be accessible from a central location.

In many embodiments, method 400 can comprise activity 412 of performing new transformations. In some embodiments, activity 412 can be performed as a part of or separate from and after activity 407 and/or can be performed after activity 410. In various embodiments, data accessed by new software needs to be modified and/or transformed in order to be processed efficiently and correctly. In the same or different embodiments, activity 412 can comprise a series of discrete transformations. In various embodiments, a discrete transformation can comprise at least one of redefining a name of a data field. In the same or different embodiments, a discrete transformation can comprise summing two data fields. In many embodiments, a discrete transformation can comprise searching a data field, and, when that data field is empty, requesting an input from a user. In the same or different embodiments, a discrete transformation can comprise aggregating values from several data fields, and then deriving a single data field value based on the aggregated value. In some embodiments, activity 412 can comprise using a distributed network comprising distributed memory architecture to perform new transformations. This distributed architecture can reduce the impact on the network and system resources to reduce congestion in bottlenecks while still allowing data to be accessible from a central location.

Figure 5:
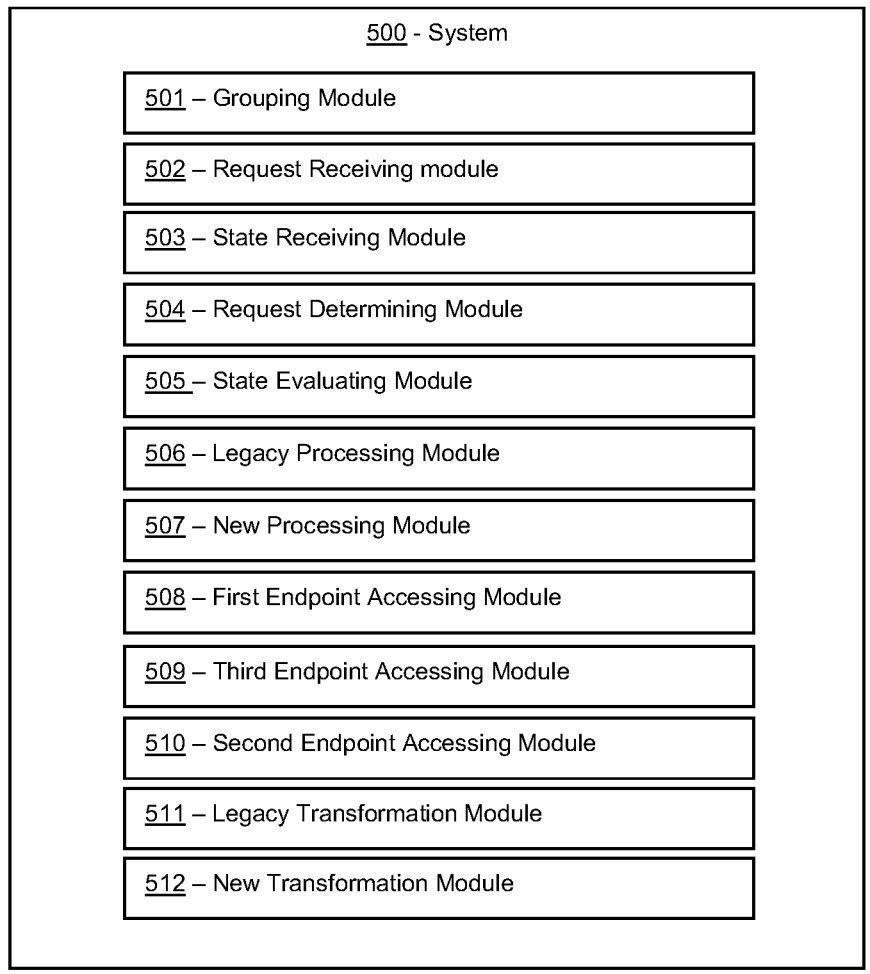
FIG. 5 illustrates a representative block diagram of a system, according to an embodiment.

Turning ahead in the drawings, FIG. 5 illustrates a block diagram of a portion of system 300 comprising servers 310, 311, user devices 320, 321 operated by users 340, 341, and internet 330, according to the embodiment shown in FIG. 3. This portion of system 300 is referred to in FIG. 5 as system 500. Each of servers 310, 311, user devices 320, 321, and internet 330 is merely exemplary and not limited to the embodiments presented herein. Each of servers 310, 311, user devices 320, 321, and internet 330 can be employed in many different embodiments or examples not specifically depicted or described herein. In some embodiments, certain elements or modules of servers 310, 311, user devices 320, 321, and internet 330 can perform various procedures, processes, and/or acts. In other embodiments, the procedures, processes, and/or acts can be performed by other suitable elements or modules.

In many embodiments, system 300 and/or system 500 can comprise non-transitory memory storage module 501. Memory storage module 501 can be referred to as grouping module 501. In many embodiments, grouping module 501 can store computing instructions configured to run on one or more processing modules and perform one or more acts of method 400 (FIG. 4) (e.g., activity 401 (FIG. 4)).

In many embodiments, system 300 and/or system 500 can comprise non-transitory memory storage module 502. Memory storage module 502 can be referred to as request receiving module 502. In many embodiments, request receiving module 502 can store computing instructions configured to run on one or more processing modules and perform one or more acts of method 400 (FIG. 4) (e.g., activity 402 (FIG. 4)).

In many embodiments, system 300 and/or system 500 can comprise non-transitory memory storage module 503. Memory storage module 503 can be referred to as state receiving module 503. In many embodiments, state receiving module 503 can store computing instructions configured to run on one or more processing modules and perform one or more acts of method 400 (FIG. 4) (e.g., activity 403 (FIG. 4)).

In many embodiments, system 300 and/or system 500 can comprise non-transitory memory storage module 504. Memory storage module 504 can be referred to as request determining module 504. In many embodiments, request determining module 504 can store computing instructions configured to run on one or more processing modules and perform one or more acts of method 400 (FIG. 4) (e.g., activity 404 (FIG. 4)).

In many embodiments, system 300 and/or system 500 can comprise non-transitory memory storage module 505. Memory storage module 505 can be referred to as state evaluating module 505. In many embodiments, state evaluating module 505 can store computing instructions configured to run on one or more processing modules and perform one or more acts of method 400 (FIG. 4) (e.g., activity 405 (FIG. 4)).

In many embodiments, system 300 and/or system 500 can comprise non-transitory memory storage module 506. Memory storage module 506 can be referred to as legacy processing module 506. In many embodiments, legacy processing module 506 can store computing instructions configured to run on one or more processing modules and perform one or more acts of method 400 (FIG. 4) (e.g., activity 406 (FIG. 4)).

In many embodiments, system 300 and/or system 500 can comprise non-transitory memory storage module 507. Memory storage module 507 can be referred to as new processing module 507. In many embodiments, new processing module 507 can store computing instructions configured to run on one or more processing modules and perform one or more acts of method 400 (FIG. 4) (e.g., activity 407 (FIG. 4)).

In many embodiments, system 300 and/or system 500 can comprise non-transitory memory storage module 508. Memory storage module 508 can be referred to as first endpoint accessing module 508. In many embodiments, first endpoint accessing module 508 can store computing instructions configured to run on one or more processing modules and perform one or more acts of method 400 (FIG. 4) (e.g., activity 408 (FIG. 4)).

In many embodiments, system 300 and/or system 500 can comprise non-transitory memory storage module 509. Memory storage module 509 can be referred to as third endpoint accessing module 509. In many embodiments, third endpoint accessing module 509 can store computing instructions configured to run on one or more processing modules and perform one or more acts of method 400 (FIG. 4) (e.g., activity 409 (FIG. 4)).

In many embodiments, system 300 and/or system 500 can comprise non-transitory memory storage module 510. Memory storage module 510 can be referred to as second endpoint accessing module 510. In many embodiments, second endpoint accessing module 510 can store computing instructions configured to run on one or more processing modules and perform one or more acts of method 400 (FIG. 4) (e.g., activity 410 (FIG. 4)).

In many embodiments, system 300 and/or system 500 can comprise non-transitory memory storage module 511. Memory storage module 511 can be referred to as legacy transformation module 511. In many embodiments, legacy transformation module 511 can store computing instructions configured to run on one or more processing modules and perform one or more acts of method 400 (FIG. 4) (e.g., activity 411 (FIG. 4)).

In many embodiments, system 300 and/or system 500 can comprise non-transitory memory storage module 512. Memory storage module 512 can be referred to as new transformation module 512. In many embodiments, new transformation module 512 can store computing instructions configured to run on one or more processing modules and perform one or more acts of method 400 (FIG. 4) (e.g., activity 412 (FIG. 4)).

Figure 6:
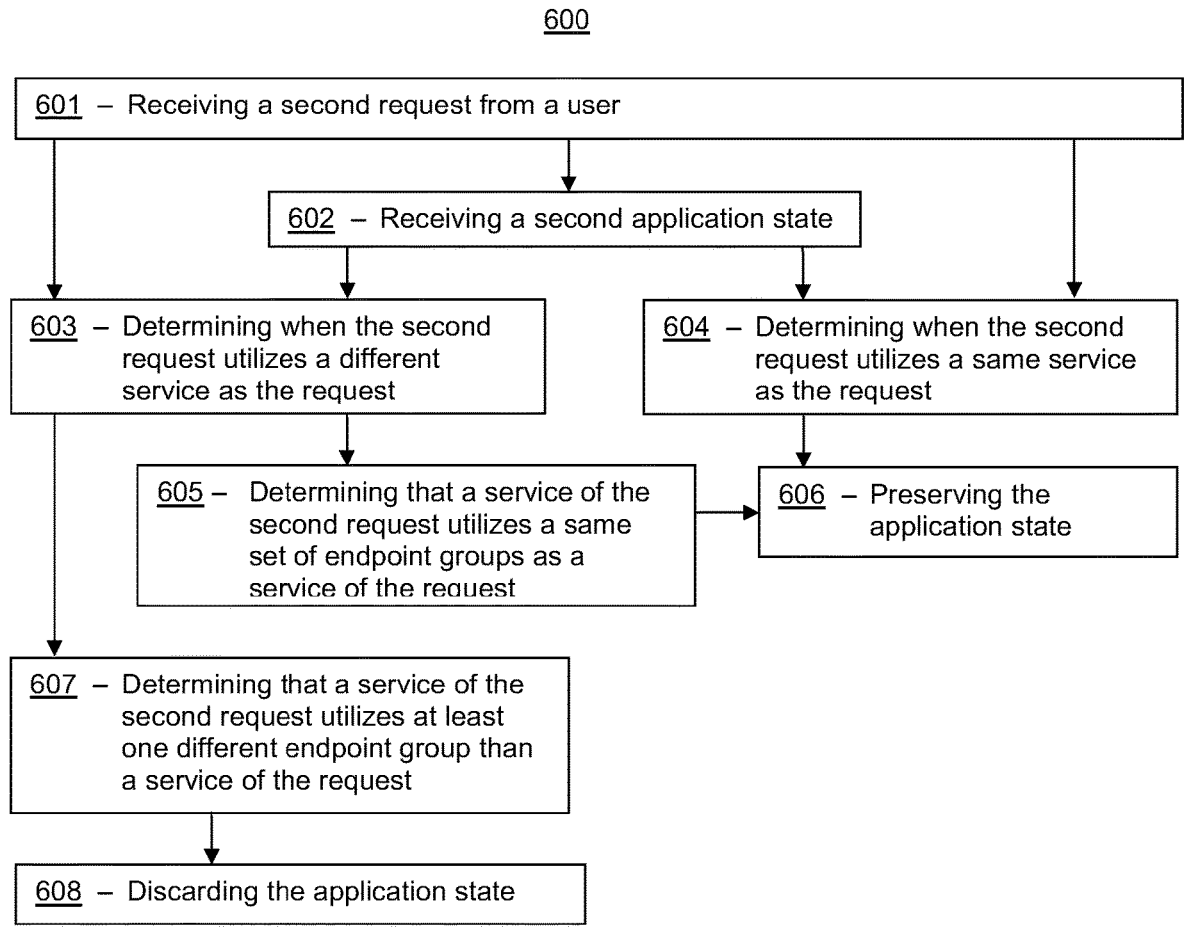
FIG. 6 illustrates a flowchart for a method, according to certain embodiments.

Turning ahead in the drawings, FIG. 6 illustrates a flow chart for a method 600, according to an embodiment. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In the same or different embodiments, method 600 can be performed after and/or in combination with method 400. In some embodiments, method 600 can be performed wholly separate from method 400. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as servers 310, 311 and/or user devices 320, 321. The processing module(s) can be similar or identical to the processing module(s) described above with respect to computer system 100 (FIG. 1).

In many embodiments, method 600 can comprise an activity 601 of receiving a second request from a user. In some embodiments, a request can come from user devices 320, 321 operated by a user 340,341 (FIG. 3). In various embodiments, a request from a user can comprise one or more endpoints. In the same or different embodiments, a request can comprise one or more endpoint groups. In many embodiments, due to the dynamic, real time nature of the disclosed systems and/or methods, a second request can be received immediately after or at a same time at a first request. In various embodiments, requests are continuously received from user devices 320, 321 in a stream or received iteratively. In some embodiments, activity 601 can comprise using a distributed network comprising distributed memory architecture to receive a second request from a user. This distributed architecture can reduce the impact on the network and system resources to reduce congestion in bottlenecks while still allowing data to be accessible from a central location.

In many embodiments, method 600 can comprise an activity 602 of receiving an application state. In some embodiments, activity 602 can be performed in conjunction with, at a same time as, or completely separate from and after activity 601. In various embodiments, the application state can comprise stateful data stored in an application. For example, the application state can comprise data about a name of a user, an email address of a user, items placed in an electronic shopping cart of a user, a preferred brick and mortar store of a user, orders of a user that have been place, but not picked up, and/or order of a user that have been placed, but not delivered. In the same or different embodiments, application state can comprise a remote software configuration value indicating when a legacy software or a new software processes a request, a remote service configuration value indicating when a specific service of a legacy software or a specific service of a new software processes a request; a store value indicating when a brick and mortar retail store selected by a user requires either a legacy software or a new software; a sign-in value indicating when a user is signed into an account of a user; and/or an account value indicating when an account of a user requires either a legacy software or a new software. In some embodiments, the application state can be stored in an application data store. In the same or different embodiments, an application data store can be stored on user devices 320, 321. In many embodiments, an application data store can comprise a relational database or a graph database. In some embodiments, activity 603 can comprise using a distributed network comprising distributed memory architecture to receive an application state. This distributed architecture can reduce the impact on the network and system resources to reduce congestion in bottlenecks while still allowing data to be accessible from a central location.

Due to the dynamic, real-time switching between legacy and new software systems described here, activity 601 can present numerous, additional problems. For example, the software modules servicing user devices 320, 321 must be updated as application state changes. In addition, legacy and new software systems need to be able to understand and use data from different software modules, which may be incompatible depending on which software system was used last.

Therefore, in many embodiments, method 600 can comprise activity 603 of determining when a second request utilizes a different service as a request such as the previous request.

In many embodiments, method 600 also can comprise activity 604 of determining when a second request utilizes a same service as a request such as the previous request. In some embodiments, a service can comprise a software module that uses data from an endpoint and/or endpoint group to achieve a goal of the software system. For example, a software service can modify entries in a database when a user adds items to his electronic shopping cart. In some embodiments, activity 604 can comprise using a distributed network comprising distributed memory architecture to determine when a second request utilizes a same service as a request. This distributed architecture can reduce the impact on the network and system resources to reduce congestion in bottlenecks while still allowing data to be accessible from a central location.

In many embodiments, method 600 can comprise activity 605 of determining that a service of a second request utilizes a same set of endpoint groups as a service of a request such as the previous request. In various embodiments, activity 605 can be performed in conjunction with, at the same time as, or completely separate from and after activity 603. In some embodiments, activity 605 can comprise using a distributed network comprising distributed memory architecture to determine that a service of a second request utilizes a same set of endpoint groups as a service of a request such as the previous request. This distributed architecture can reduce the impact on the network and system resources to reduce congestion in bottlenecks while still allowing data to be accessible from a central location.

In many embodiments, method 600 can comprise activity 606 of preserving an application state. In various embodiments, activity 606 can be performed after activities 603, 604, 605. When same application state is used by a service, there can be no need to discard the application state because it can be re-used by a service for a second request. In some embodiments, activity 606 can comprise using a distributed network comprising distributed memory architecture to preserve application state. This distributed architecture can reduce the impact on the network and system resources to reduce congestion in bottlenecks while still allowing data to be accessible from a central location.

In many embodiments, method 600 can comprise activity 607 of determining that a service of a second request utilizes at least one different endpoint group as a service of a request such as the previous request. In various embodiments, activity 607 can be performed in conjunction with, at a same time as, or completely separate from and after activity 603. In some embodiments, activity 607 can comprise using a distributed network comprising distributed memory architecture to determine that a service of a second request utilizes at least one different endpoint group as a service of a request such as the previous request. This distributed architecture can reduce the impact on the network and system resources to reduce congestion in bottlenecks while still allowing data to be accessible from a central location.

In many embodiments, method 600 can comprise activity 608 of discarding an application state. By discarding application state, recurring cycles of state changes, that trigger software module changes, that then trigger state changes, that then trigger software module changes, etc. can be avoided. Activity 608 can occur after activity 607, and in some embodiments, activity 608 can comprise using a distributed network comprising distributed memory architecture to discard application state. This distributed architecture can reduce the impact on the network and system resources to reduce congestion in bottlenecks while still allowing data to be accessible from a central location.

Figure 7:
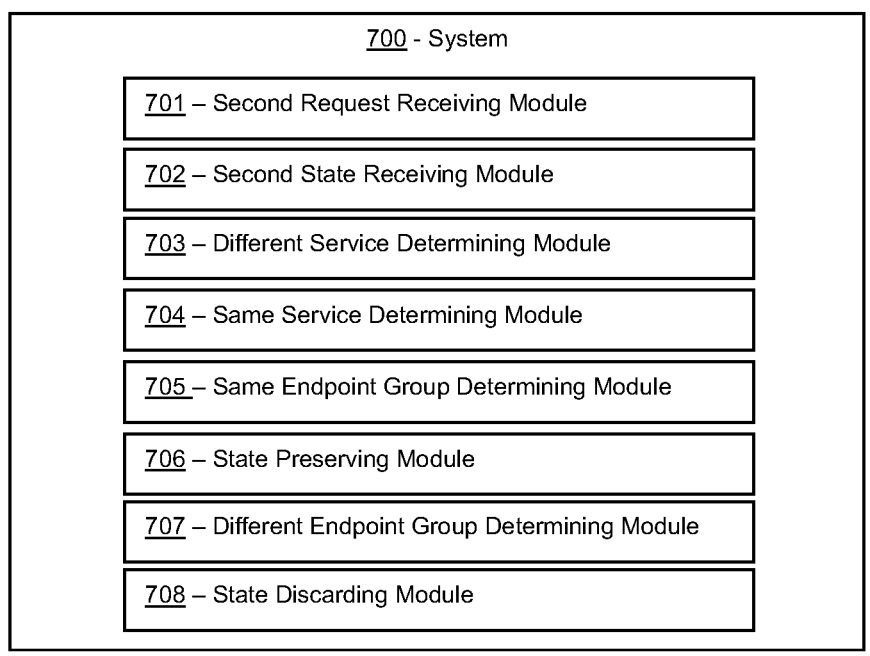
FIG. 7 illustrates a representative block diagram of a system, according to an additional embodiment.

Turning ahead in the drawings, FIG. 7 illustrates a block diagram of a portion of system 300 comprising servers 310, 311, user devices 320, 321 operated by users 340, 341, and internet 330, according to the embodiment shown in FIG. 3. This portion of system 300 is referred to in FIG. 7 as system 700. Each of servers 310, 311, user devices 320, 321, and internet 330 is merely exemplary and not limited to the embodiments presented herein. Each of servers 310, 311, user devices 320, 321, and internet 330 can be employed in many different embodiments or examples not specifically depicted or described herein. In some embodiments, certain elements or modules of servers 310, 311, user devices 320, 321, and internet 330 can perform various procedures, processes, and/or acts. In other embodiments, the procedures, processes, and/or acts can be performed by other suitable elements or modules.

In many embodiments, system 300 and/or system 700 can comprise non-transitory memory storage module 701. Memory storage module 701 can be referred to as second request receiving module 701. In many embodiments, second request receiving module 701 can store computing instructions configured to run on one or more processing modules and perform one or more acts of method 600 (FIG. 6) (e.g., activity 601 (FIG. 6)).

In many embodiments, system 300 and/or system 700 can comprise non-transitory memory storage module 702. Memory storage module 702 can be referred to as second state receiving module 702. In many embodiments, second state receiving module 702 can store computing instructions configured to run on one or more processing modules and perform one or more acts of method 600 (FIG. 6) (e.g., activity 602 (FIG. 6)).

In many embodiments, system 300 and/or system 700 can comprise non-transitory memory storage module 703. Memory storage module 703 can be referred to as different service determining module 703. In many embodiments, different service determining module 703 can store computing instructions configured to run on one or more processing modules and perform one or more acts of method 600 (FIG. 6) (e.g., activity 603 (FIG. 6)).

In many embodiments, system 300 and/or system 700 can comprise non-transitory memory storage module 704. Memory storage module 704 can be referred to as same service determining module 704. In many embodiments, same service determining module 704 can store computing instructions configured to run on one or more processing modules and perform one or more acts of method 600 (FIG. 6) (e.g., activity 604 (FIG. 6)).

In many embodiments, system 300 and/or system 700 can comprise non-transitory memory storage module 705. Memory storage module 705 can be referred to as same endpoint group determining module 705. In many embodiments, same endpoint group determining module 705 can store computing instructions configured to run on one or more processing modules and perform one or more acts of method 600 (FIG. 6) (e.g., activity 605 (FIG. 6)).

In many embodiments, system 300 and/or system 700 can comprise non-transitory memory storage module 706. Memory storage module 706 can be referred to as state preserving module 706. In many embodiments, state preserving module 706 can store computing instructions configured to run on one or more processing modules and perform one or more acts of method 600 (FIG. 6) (e.g., activity 606 (FIG. 6)).

In many embodiments, system 300 and/or system 700 can comprise non-transitory memory storage module 707. Memory storage module 707 can be referred to as different endpoint group determining module 707. In many embodiments, different endpoint group determining module 707 can store computing instructions configured to run on one or more processing modules and perform one or more acts of method 600 (FIG. 6) (e.g., activity 607 (FIG. 6)).

In many embodiments, system 300 and/or system 700 can comprise non-transitory memory storage module 708.

Memory storage module 708 can be referred to as state discarding module 708. In many embodiments, state discarding module 708 can store computing instructions configured to run on one or more processing modules and perform one or more acts of method 600 (FIG. 6) (e.g., activity 608 (FIG. 6)).

Although systems and methods for concurrently hosting legacy and new systems have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions configured to run on the one or more processors and perform acts of:
      grouping one or more endpoints into endpoint groups such that each endpoint group of the endpoint groups can be processed by both a legacy software and a new software;
      receiving a request from a user, the request comprising the one or more endpoints;
      upon receiving the request, automatically and dynamically determining in real-time whether the request is a legacy software request for the legacy software or a new software request for the new software; and
      automatically either:
         processing the request using the legacy software when the automatically and dynamically determining in real-time determines that the request is the legacy software request; or
         processing the request using the new software when the automatically and dynamically determining in real-time determines that the request is the new software request.

2. The system of claim 1, wherein:
   the computing instructions are further configured to perform an act of:
      receiving, from an application data store, an application state;
   automatically and dynamically determining in real-time whether the request is the legacy software request or the new software request comprises:
      evaluating the application state.

3. The system of claim 2, wherein the application state comprises at least one of:
   a remote software configuration value indicating when the legacy software or the new software processes the request;
   a remote service configuration value indicating when a specific service of the legacy software or a specific service of the new software processes the request;
   a store value indicating when a brick and mortar retail store selected by the user requires either the legacy software or the new software;
   a sign-in value indicating when the user is signed into an account of the user; or
   an account value indicating when the account of the user requires either the legacy software or the new software.

4. The system of claim 2, wherein:
   the application state indicates that the user is registering an account; and
   the computing instructions are further configured to perform acts of:
      determining that a brick and mortar retail store of the user requires the new software; and
      processing the request of the user using only the new software.

5. The system of claim 2, wherein the computing instructions are further configured to perform acts of:
   receiving a second request from the user, the second request comprising at least the one or more endpoints;
   determining when the second request utilizes a same service as the request;
   determining when the second request utilizes a different service than the request; and
   when determining the second request utilizes the same service as the request, preserving the application state.

6. The system of claim 5, wherein:
   determining when the second request utilizes the different service than the request comprises:
      determining that a service of the second request utilizes a same set of the endpoint groups as a service of the request; and
   the computing instructions are further configured to perform an act of:
      when determining the second request utilizes the different service than the request, preserving the application state.

7. The system of claim 5, wherein:
   determining when the second request utilizes the different service than the request comprises:
      determining that a service of the second request utilizes at least one different endpoint group than a service of the request; and
   the computing instructions are further configured to perform an act of:
      when determining the second request utilizes the different service than the request, discarding the application state.

8. The system of claim 7, wherein the computing instructions are further configured to perform an act of:

after receiving the second request from the user, updating the application state.

9. The system of claim 1, wherein:
automatically processing the request using the legacy software comprises:
performing a series of legacy software transformations on the request to convert data in the request to a legacy software format for the legacy software; and
automatically processing the request using the new software comprises:
performing a series of new software transformations on the request to convert data in the request to a new software format for the new software.

10. The system of claim 1, wherein:
automatically processing the request using the legacy software when the automatically and dynamically determining in real-time determines that the request is the legacy software request further comprises:
accessing, by a legacy service of the legacy software, a first endpoint group comprising a first endpoint of the one or more endpoints; and
accessing, by a legacy service of the legacy software, a second endpoint group comprising a second endpoint of the one or more endpoints; and
automatically processing the request using the new software when the automatically and dynamically determining in real-time determines that the request is the new software request further comprises:
accessing, by a legacy service of the legacy software, the second endpoint group comprising the second endpoint of the one or more endpoints; and
accessing, by a legacy service of the legacy software, a third endpoint group comprising a third endpoint of the one or more endpoints.

11. A method being implemented via execution of computing instructions configured to run at one or more processors and configured to be stored at non-transitory computer-readable media, the method comprising: P2 grouping one or more endpoints into endpoint groups such that each endpoint group of the endpoint groups can be processed by both a legacy software and a new software;
receiving a request from a user, the request comprising the one or more endpoints;
upon receiving the request, automatically and dynamically determining in real-time whether the request is a legacy software request for the legacy software or a new software request for the new software; and
automatically either:
processing the request using the legacy software when the automatically and dynamically determining in real-time determines that the request is the legacy software request; or
processing the request using the new software when the automatically and dynamically determining in real-time determines that the request is the new software request.

12. The method of claim 11, wherein:
the method further comprises:
receiving, from an application data store, an application state;
automatically and dynamically determining in real-time whether the request is the legacy software request or the new software request comprises:
evaluating the application state.

13. The method of claim 12, wherein the application state comprises at least one of:

a remote software configuration value indicating when the legacy software or the new software processes the request;
a remote service configuration value indicating when a specific service of the legacy software or a specific service of the new software processes the request;
a store value indicating when a brick and mortar retail store selected by the user requires either the legacy software or the new software;
a sign-in value indicating when the user is signed into an account of the user; or
an account value indicating when the account of the user requires either the legacy software or the new software.

14. The method of claim 12, wherein:
the application state indicates that the user is registering an account; and
the method further comprises:
determining that a brick and mortar retail store of the user requires the new software; and
processing the request of the user using only the new software.

15. The method of claim 12, wherein the method further comprises:
receiving a second request from the user, the second request comprising at least the one or more endpoints;
determining when the second request utilizes a same service as the request;
determining when the second request utilizes a different service than the request; and
when determining the second request utilizes the same service as the request, preserving the application state.

16. The method of claim 15, wherein:
determining when the second request utilizes the different service than the request comprises:
determining that a service of the second request utilizes a same set of the endpoint groups as a service of the request; and
the method further comprises:
when determining the second request utilizes the different service than the request, preserving the application state.

17. The method of claim 15, wherein:
determining when the second request utilizes the different service than the request comprises:
determining that a service of the second request utilizes at least one different endpoint group than a service of the request; and
the method further comprises:
when determining the second request utilizes the different service than the request, discarding the application state.

18. The method of claim 15, wherein the method further comprises:
after receiving the second request from the user, updating the application state.

19. The method of claim 11, wherein:
automatically processing the request using the legacy software comprises:
performing a series of legacy software transformations on the request to convert data in the request to a legacy software format for the legacy software; and
automatically processing the request using the new software comprises:
performing a series of new software transformations on the request to convert data in the request to a new software format for the new software.

20. The method of claim 11, wherein:
automatically processing the request using the legacy software when the automatically and dynamically determining in real-time determines that the request is the legacy software request further comprises:
  accessing, by a legacy service of the legacy software, a first endpoint group comprising a first endpoint of the one or more endpoints; and
  accessing, by a legacy service of the legacy software, a second endpoint group comprising a second endpoint of the one or more endpoints; and
automatically processing the request using the new software when the automatically and dynamically determining in real-time determines that the request is the new software request further comprises:
  accessing, by a legacy service of the legacy software, the second endpoint group comprising the second endpoint of the one or more endpoints; and
  accessing, by a legacy service of the legacy software, a third endpoint group comprising a third endpoint of the one or more endpoints.

\* \* \* \* \*